9061X
T. Odiorne,
Windlass Water Elevator.
Patented Aug. 27, 1835.
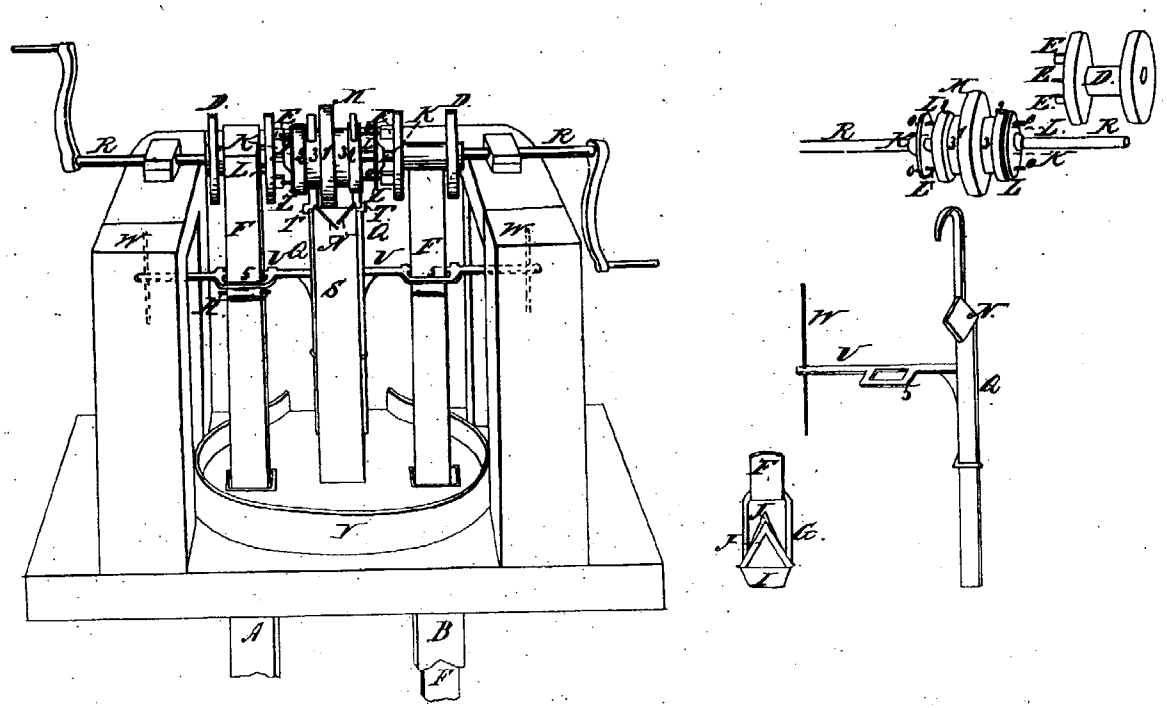
N. PETERS, PHOTO-LITHOGRAPHER, WASHINGTON, D. C.

1 4A

Letters Patent
No 518 [illegible] 27th Aug 1835
9061X Thomas Odiorne

The Schedule [illegible] to these Letters Patent and making
part of the same containing a description in the words of the said
Thomas Odiorne himself of his improvement in the construction of
pumps applicable to ships and other purposes where a regular
flow is desired.

---

To all to whom these Presents shall come.
Be it known that I Thomas Odiorne of Portsmouth in
the County of Rockingham and State of New Hampshire have
invented a new and useful improvement in the method of con-
structing rotary pumps for water applicable to ships or other
purposes where a regular flow is desired, or when much water is
wanted to be discharged by the method the most effectually calcu-
lated to save time and to equalize the power exerted and that the
following is a clear and exact description of the construction and
operation of the said machine as invented or improved by me. In the
manner of applying my improvement, I place two pumps side by
side, which may be either round or square, though I prefer the
square ones and will designate them by the letters. [illegible] in the
annexed drawings which are intended to be referred to in the
explanation of my plan. These pumps are intended to be
worked by one and the same shaft K, which is to be turned
in ships &c by one or more cranks, and they are to act al-
ternately one only being operated on at a time, and yet a
constant flow of water is kept up from the discharge. The
machinery by which I effect this continued discharge is thus
combined and constructed. R, represents the shaft having at
each end a crank, D. The two cylinders or drums which work or
revolve loosely on the shaft immediately over the pumps one to each 9vvx They have flanges projecting at each end so as to retain the belt or chain
(which descends into the pump) in its proper situation as it is wound
upon the drum lest it should slip off there are also small pro-
jections or Cogs upon one end of each as at E, and these may
be four in number. A small colar on the axis at the opposite end
prevents them from sliding back too far in that direction, F rep-
resents the belt or chain, which is to descend as low into the pump
as may be requisite for the dipper or box G to fall. It has also a
small catch H secured to it at a certain distance below the cylin-
der such as may be proportioned to the height to which the water
is intended to be raised by the dipper G G the upper box or dipper
which is made with a narrow base I of some heavy metal. The
shape of this dipper is so constructed as to fit across the bore of the
pump diagonally, the wings J unfolding outwards against the sides
of the pump (where square ones are used) in ascending with their load
of water, folding inwards when descending so as to permit the
metal base to carry down the dipper by unwinding the chain until
it has reached its lowest position in the pump and is again
ready to ascend. The wings are made of leather, and faced
on the upper face by metal plates (Copper is well adapted) K are
two metal plates placed one on each end E, of the cylinders at
such a distance from said end as to just clear the projection
from those ends, and these plates are secured to the axis so as to be
immovable, and have two holes L one on each side of the axis
of each plate. M, represents a clutch wheel which is to be placed
between these plates K, thereby occupying the central space
between them and over the pumps. The drawings will give the
best idea of the form of the clutch wheel I have found most
useful, though other shapes may be equally well applied,
and in this one the central portion 1 has the diameter much greater
than any other part so as to descend to the lips, or oblique plates
N placed beneath it and the remaining portions of the wheel
on each side the central one, have their diameters much

9061X decreased, those at 2 being much less than that at 1, betw
2 & 1 the diameter is still decreased to form a groove 3. On each
outer end of the parts 2, are placed two pins O. projecting outwar
or towards the plate K, which they are intended to pass throu
by the openings or holes L left therein for that purpose far enough
strike on or to join against the projections or cogs E. so as to work
gear with them and as the axis turns so will the cylinder turn
into which the pins are geared. These pins are also just long enou
to each end of parts 2, to allow them to be driven at one end; int
the holes of the plate K. and entirely through, until the part 2 join
the plate K. while those pins at the other end 2, are drawn out o
the plate K so far as to leave just enough to hold on by in the
plate so as still to have the clutch wheel forced round by the
revolution of the plates & the connection of the pins. That pa
of the main axle R. upon which the clutch wheel slips backw
and forwards may be either round or square Q Q represent the
shipper rods for the shape of which I refer to the drawings Th
are let into the sides of the center post S next to the pumps &
there retained but in such a manner as to allow them to
rise up or descend as required. The oblique plates or lips N.
set and notch on the top of the center post S & are connecte
with the shaft of the shipper rod, which is just then confine
by a small groove or catch T secured to the top of the post
and behind the lips. Above this part the rod rises and
bends over the clutch wheel at the part 2 which it encircl
partly or nearly half round like a hook, of sufficient
width to fall into the groove 3 when requisite. Its upper
arms projecting from the rod at right angles and ex-
tending far enough beyond the drums D. to admit of a
eye 5 underneath for the belt or chain to run through
and also to admit a round hole 6 beyond the eye through
the end of the arm intended to slide up and down upon a 90 61 X shaft or rod W descending from the frame work above, & intended to regulate the motion of the arm & eye in rising and falling. Y. represents a lip or basin round the top of the pump on the platform or deck intended to conduct the water to the discharging point. Operation. The power being applied by the crank the axis or shaft is turned which causes the revolution of the drum which is then in gear, this winds up the belt or chain & consequently draws up its dipper to the top of the pump when it discharges its water into the lip or basin on deck, at this moment the catch strikes against the eye and carries it up this of course raises the shipper rod and with the lip or oblique plane which is thus brought in contact with the larger diameter of the clutch wheel and striking it on the edge forces it over towards the opposite drum, at the same moment that the hook is raised out of the groove in which it lay to the top of the second length of diameter of the clutch wheel, which thus has an opportunity of slipping under the hook as the wheel shifts, and the pins being thrust through the holes of the plate at the other end, the drum at that end falls into gear and the hook falling into place in the groove retains the clutch wheel steady during the revolution of that drum in order to raise its dipper and load. In the meantime the first drum being relieved from gear it revolves backwards by the weight of the dippers base (which dipper has been discharged) & both dipper and belt descend to their lowest stations again, till the shifting of the clutch wheel once more, when the same operation commences on the other pump & thus one is always at work, and a uniform stream of water discharged thereby. What I claim as my own invention and not previously known he above described machine --- is not the principle
raising water by means of a rotary pump, but for
improvement applied to a practical use, effected
a combination of various mechanical powers
ducing the effect of raising water by a peculiar
eration, and the various parts I claim the use of I
designate according to their letters viz 1st The
plication of the drums D shaped with the projections E.
cogs thereon for the purpose and after the manner
scribed. 2d the Clutch wheel K designed for the use
have set forth of gearing and ungearing the drums D
ough the form may be varied to answer the same
rpose. 3d The shipper rods Q.Q shaped as I have
scribed them and to be used after the manner & for
e purpose already set forth in their various parts.

In Testimony that the above is a full
and exact description of the Construction
and modes of operation of my machine as
invented or improved by me I have hereunto
set my hand this fifteenth day of July eighteen
hundred and thirty five.

Witnesses
H. W. Wharton
[illegible] Stone

Thomas Odiorne

[illegible]

Recorded [illegible]

([illegible])